US009584178B2

(12) United States Patent
Derby et al.

(10) Patent No.: US 9,584,178 B2
(45) Date of Patent: Feb. 28, 2017

(54) CORRELATING PSEUDONOISE SEQUENCES IN AN SIMD PROCESSOR

(71) Applicant: International Business Machines Corporation, Armonk, NY (US)

(72) Inventors: Jeffrey H. Derby, Chapel Hill, NC (US); Dheeraj Sreedhar, Karnataka (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 155 days.

(21) Appl. No.: 14/336,430

(22) Filed: Jul. 21, 2014

(65) Prior Publication Data

US 2016/0020821 A1    Jan. 21, 2016

(51) Int. Cl.
  *H04B 1/709* (2011.01)
  *G06F 9/38* (2006.01)
  *G06F 9/30* (2006.01)

(52) U.S. Cl.
  CPC ........... *H04B 1/709* (2013.01); *G06F 9/3001* (2013.01); *G06F 9/30036* (2013.01); *G06F 9/3887* (2013.01)

(58) Field of Classification Search
  CPC ..... G06F 9/30; G06F 9/35; G06F 9/44; G06F 12/00; G06F 15/00; G06F 15/76; H04B 1/69; H04B 1/707; H04B 1/709; H04B 7/216
  USPC .......... 375/142, 146, 147, 150; 712/4, 7, 35, 712/217, 221
  See application file for complete search history.

(56) References Cited

U.S. PATENT DOCUMENTS

| 6,788,731 B2 | 9/2004 | Kim et al. | |
| 7,145,938 B2 * | 12/2006 | Takeuchi | H04B 1/7075 375/147 |
| 7,249,350 B2 * | 7/2007 | Wang | G06F 8/52 712/22 |

(Continued)

FOREIGN PATENT DOCUMENTS

WO    2013082372    6/2013

OTHER PUBLICATIONS

Glossner et al., "A Reconfigurable Baseband for 2.5 G/3G and Beyond." Proceedings of the 2003 World Wireless Congress, 6 pgs.

(Continued)

*Primary Examiner* — Shawkat M Ali
(74) *Attorney, Agent, or Firm* — Cantor Colburn LLP (57) ABSTRACT

In one embodiment, a method includes receiving a signal having communication data from two or more mobile devices, each identifiable by an associated pseudonoise sequence. A first mobile device is identifiable by a first pseudonoise sequence. Two or more samples of the received signal are stored in an input register. A segment of the first pseudonoise sequence is stored as a bit vector in a second register. The SIMD instruction is processed, by an SIMD processor, to produce correlation values associated with the segment of the first pseudonoise sequence and the samples of the received signal. Processing the SIMD instruction includes distributing the segment of the first pseudonoise sequence, as a bit vector, across two or more lanes of the SIMD processor. The processing contributes to despreading the received signal, and an output of the processing includes at least a portion of the communication data from the first mobile device.

12 Claims, 5 Drawing Sheets

(56) References Cited

U.S. PATENT DOCUMENTS

| | | | |
|---|---|---|---|
| 7,360,063 B2 | 4/2008 | Capek et al. | |
| 8,170,087 B2 | 5/2012 | Moerman et al. | |
| 2003/0202569 A1* | 10/2003 | Kim | G06F 17/15 375/150 |
| 2006/0013287 A1* | 1/2006 | Normark | G01S 19/29 375/142 |
| 2006/0274822 A1* | 12/2006 | Stahlberg | H04B 1/707 375/150 |
| 2010/0272157 A1* | 10/2010 | Lakkis | H04B 1/7093 375/146 |
| 2010/0290506 A1* | 11/2010 | Kerr | H04J 13/0074 375/147 |
| 2012/0089792 A1* | 4/2012 | Fahs | G06F 9/30036 711/154 |
| 2012/0260062 A1 | 10/2012 | Derby et al. | |
| 2013/0093496 A1 | 4/2013 | Waters et al. | |
| 2013/0136154 A1* | 5/2013 | Chomal | H04B 1/7075 375/136 |
| 2013/0339649 A1* | 12/2013 | Hsu | G06F 3/14 711/170 |
| 2014/0237218 A1* | 8/2014 | Gopal | G06F 9/3001 712/222 |
| 2015/0143078 A1* | 5/2015 | Khan | G06F 15/8053 712/7 |

OTHER PUBLICATIONS

Hsu, "High-Performance Vector Processing for Multi-User Detection in Spread-Spectrum Communication," A thesis submitted to the Department of Electrical and Computer Engineering in conformity with the requirements for the degree of Master of Science (Engineering) Queen's University Kingston, Ontario, Canada Sep. 2000, 133 pgs.

Tiefenbacher et al., A Four Channel CMOS Codec Filter Circuit "SICOFI@-4••," IEEE Journal of Solid-State Circuits, vol. 29, No. 8, Aug. 1994, 8 pgs.

Wagner et al., "Fast Multi-tone Phase Calibration Signal Extraction," PoS Proceedings of Science—"No Conference" Copyright owned by the author(s) under the terms of the Creative Commons Attribution-NonCommercial-ShareAlike Licence; 22 pgs.

Wilhalm et al.,"SIMD-Scan: Ultra Fast in-Memory Table Scan using on-Chip Vector Processing Units,"Proceedings of the VLDB Endowment 2.1 (2009): 385-394.

* cited by examiner

CORRELATING PSEUDONOISE SEQUENCES IN AN SIMD PROCESSOR

BACKGROUND

Various embodiments of this disclosure relate to correlating pseudonoise sequences and, more particularly, to correlating such sequences using a single instruction, multiple data (SIMD) processor.

Pseudonoise sequences are used in many communication systems, notably in wideband code division multiple access (WCDMA), also known as 3G wireless systems, where the sequences are used to "spread" multiple users' transmitted data across a shared channel in such a way that a multiplicity of users can efficiently share the same bandwidth. A "despreading" operation, which separates received signals from different user devices across the shared channel, requires correlation of signals being received with copies of the pseudonoise sequences used by individual user devices to transmit their data.

A pseudonoise sequence is a sequence of complex, purely real, or purely imaginary values, where the real parts and imaginary parts take on only the values +/−1. In other words, the elements of such a sequence are: +/−1 if the sequence is purely real, +/−j if the sequence is purely imaginary, and (+/−1)+/−j if the sequence is complex. An element of a pseudonoise sequence can be represented in a processor using a single bit if the sequence contains only purely real or imaginary values, or by a pair of bits if the sequence elements are complex; for example, with a '0' bit corresponding to +1 and a '1' bit corresponding to −1 for a purely real sequence. Thus, a pseudonoise sequence can be represented in a processor as a vector of bits.

The operation for correlation of received signals is often formulated as follows:

$$s(n) = \sum_{m=0}^{L-1} f(Ln+m) \sum_{i=0}^{M-1} y(q_o + i) c(q_o + i)$$

In the above, each y is a sample of a received signal, c is the pseudonoise sequence to be correlated to a portion of the single, f represents a sequence to correct for carrier frequency offset, and s(n) is an initial estimate of the data bit sent by a user device at time n. The inner sum over i is the correlation of the received signal with the pseudonoise sequence.

In WCDMA, a user device transmits data in the form of a series of symbols. A symbol that a device sends may be combined with a device-specific pseudonoise sequence, sometimes referred to a spreading sequence. The despreading operation may correlate a sample of a received signal with a device-specific pseudonoise sequence to extract the part of the signal that was received from the device in question.

A user symbol may be the equivalent of a data bit. The number of elements, K, in a pseudonoise sequence is referred to as the spreading factor. Values of K generally range from 8 or less to 256. To generate an estimate of a device's transmitted symbol value, K samples of the received signal are correlated with K elements of the device's pseudonoise sequence. In some cases, "oversampling" of a received signal is used, in which case the number of samples is a multiple of K. The correlation takes into account that a carrier frequency is offset between the transmitter (i.e., the device) and receiver (e.g., the base station). Compensation for this effect involves incorporating a correction sequence (T in the above equation) in the correlation. Typically, the frequency offset varies slowly over time, but the equation assumes the correction term is approximately constant over blocks of N samples of the received signals. Thus, there are K received samples to process in the despreading per transmitted user symbol. Usually, N is less than K, and there are L blocks of size M, where K=L*M. The term in the correlation equation associated with the frequency offset correction can therefore be applied once per block of size N (of which there are L per symbol). In the above equation, $q_o$ represents the first received sample for symbol 'n' in block 'm'.

Performance requirements for the despreading function in typical WCDMA base stations have led to the use of special-purpose hardware accelerators to implement the operations shown in the equation above, with data moved by a processor to and from this hardware by direct memory access (DMA) or a related mechanism.

SUMMARY

In one embodiment of this disclosure, a computer-implemented method includes receiving a signal that includes communication data from two or more mobile devices. Each of the two or more mobile devices is identifiable by an associated pseudonoise sequence, and a first mobile device of the two or more mobile devices is identifiable by an associated first pseudonoise sequence. Two or more samples of the received signal are stored in an input register. A segment of the first pseudonoise sequence is stored as a bit vector in a second register. The SIMD instruction is processed, by an SIMD processor, to produce correlation values associated with the segment of the first pseudonoise sequence in the second register and the two or more samples of the received signal in the input register. The processing of the SIMD instruction includes distributing the segment of the first pseudonoise sequence, as stored as the bit vector in the second register, across two or more lanes of the SIMD processor. Further, the processing of the SIMD instruction contributes to despreading the received signal, and an output of the processing of the SIMD instruction comprises at least a portion of the communication data from the first mobile device.

In another embodiment, a system includes a memory having computer readable instructions and a processor configured to execute the computer readable instructions. The instructions include receiving a signal that includes communication data from two or more mobile devices. Each of the two or more mobile devices is identifiable by an associated pseudonoise sequence, and a first mobile device of the two or more mobile devices is identifiable by an associated first pseudonoise sequence. Further according to the instructions, two or more samples of the received signal are stored in an input register. A segment of the first pseudonoise sequence is stored as a bit vector in a second register. The SIMD instruction is submitted to an SIMD processor for processing, to produce correlation values associated with the segment of the first pseudonoise sequence in the second register and the two or more samples of the received signal in the input register. The processing of the SIMD instruction includes distributing the segment of the first pseudonoise sequence, as stored as the bit vector in the second register, across two or more lanes of the SIMD processor. Further, the processing of the SIMD instruction contributes to despreading the received signal, and an output of the processing of the SIMD instruction comprises at least a portion of the communication data from the first mobile device.

In yet another embodiment, a computer program product for despreading a received signal includes a computer readable storage medium having program instructions embodied therewith. The program instructions are executable by a processor to cause the processor to perform a method. The method includes receiving a signal that includes communication data from two or more mobile devices. Each of the two or more mobile devices is identifiable by an associated pseudonoise sequence, and a first mobile device of the two or more mobile devices is identifiable by an associated first pseudonoise sequence. Further according to the method, two or more samples of the received signal are stored in an input register. A segment of the first pseudonoise sequence is stored as a bit vector in a second register. The SIMD instruction is submitted to an SIMD processor for processing, to produce correlation values associated with the segment of the first pseudonoise sequence in the second register and the two or more samples of the received signal in the input register. The processing of the SIMD instruction includes distributing the segment of the first pseudonoise sequence, as stored as the bit vector in the second register, across two or more lanes of the SIMD processor. Further, the processing of the SIMD instruction contributes to despreading the received signal, and an output of the processing of the SIMD instruction comprises at least a portion of the communication data from the first mobile device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

According to this disclosure, despreading systems, methods, and computer program products are configured to despread signals received at a base station from mobile devices, through use of a high-performance software despreading implementation.

Although hardware solutions for despreading currently exist, a true software implementation could improve performance. Conventionally, hardware-based implementations for despreading in WCDMA have been used because software-based solutions have not been able to provide the requisite performance. Software-based solutions that could provide the requisite performance for WCDMA despreading would be valuable because of flexibility (i.e., support for 4G as well as WCDMA) and the ability to support applications as well as physical-layer processing on the same processor platform. Some embodiments of the present despreading systems, as disclosed herein, provide software-based solutions to support WCDMA despreading with the necessary performance.

In contrast, machine instructions implemented in one of a processor's execution units that can be used to compute the sums in the despreading function may be able to use existing hardware circuits that are used by other instructions. Further, there are more general potential benefits of implementing functions entirely in software rather than relying on hardware accelerators, notably the ability to use simplified programming models and easier test, debug, and incorporation of new features. Realization of these potential benefits of a software implementation of despreading requires that the software implementation be capable of sufficient performance.

Thus, in some embodiments, a despreading system according to this disclosure may leverage the parallelism inherent in the algorithm shown in Equation 1 above, in particular with respect to the inner summation, i.e. the correlation with the pseudonoise sequence. SIMD parallelism has been previously used for implementation of ordinary correlations, e.g., where both inputs (y and c in the equation above) are sequences of numbers. According to some embodiments of this disclosure, SIMD parallelism may further be used for implementing signal correlation with pseudonoise sequences.

Figure 1:
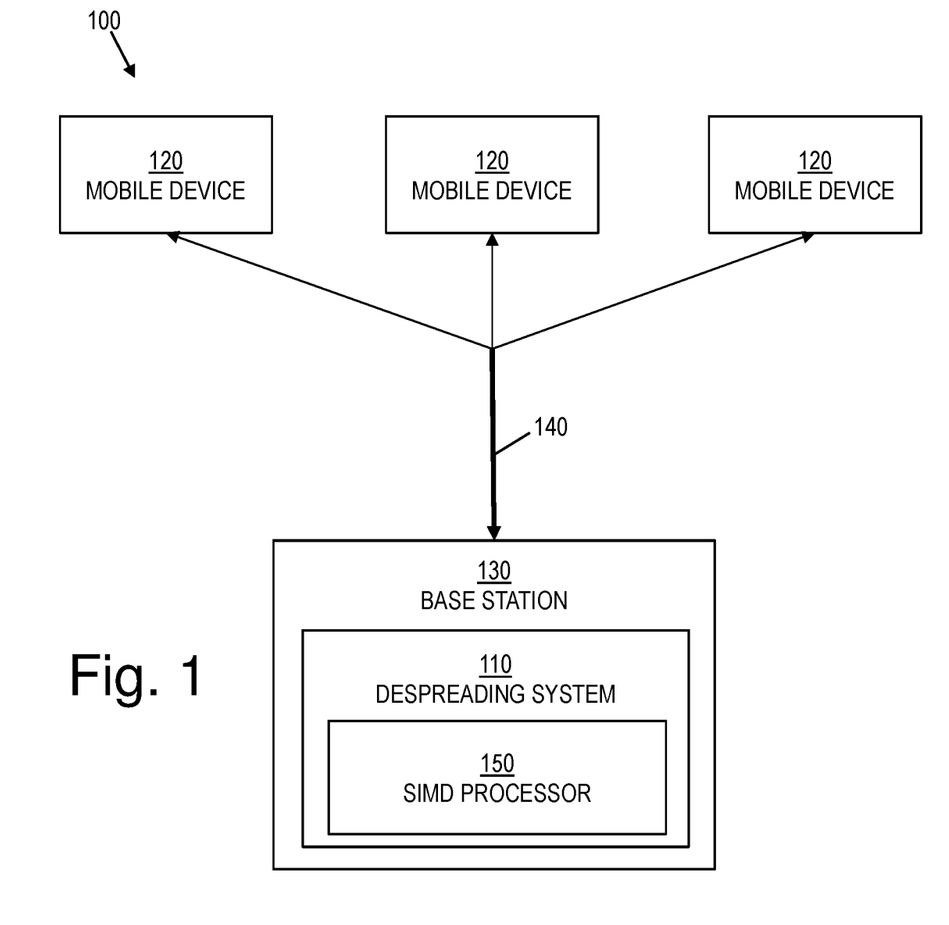
FIG. 1 is a block diagram of an environment of a despreading system, according to some embodiments of this disclosure.

FIG. 1 is a block diagram of an environment 100 of a despreading system 110, according to some embodiments of this disclosure. As shown, two or more mobile devices 120 may communicate with a base station 130 across a shared channel, resulting in the base station receiving a signal. The base station 130 may incorporate the despreading system 110 to correlate various pseudonoise sequences of the mobile devices with the received signal, thus extracting the communications received from each mobile device. Although the despreading system 110 is depicted in FIG. 1 as being entirely incorporated into the base station 130, this need not be the case. Rather, in some embodiments, it may be only some aspects of the despreading system 100 that reside in the base station 130, while others may be external to the base station 130 and in communication with aspects in the base station 130 as needed.

In some embodiments, the despreading system 110 may use one or more SIMD processors 150 for efficient despreading. Aspects of this disclosure are described in the context of an SIMD architecture with subword parallelism. As a result, an N-byte-wide vector register may contain N 1-byte data elements, N/2 2-byte data elements, N/4 4-byte data elements, etc. It will be understood, however, that the despreading systems and methods may also be applied to SIMD architectures that do not support subword parallelism.

The despreading system 110 may provide sufficient flexibility to support various approaches a programmer might take in implementing a despreading algorithm based on Equation 1 (e.g., given the range of configuration parameters that are to be supported), and also to support other algorithms involving correlation with pseudonoise sequences (e.g., cases where the input signal sample and the pseudonoise sequence are purely real or purely imaginary, as well as those where both are complex). In other words, the despreading system 110 may efficiently implement the despreading algorithm or other algorithms involving correlation with a complex, real, or imaginary pseudonoise sequence represented as a bit vector, in a processor with an SIMD architecture.

However, use of existing SIMD architectures and instruction sets (e.g., PowerPC VMX or Intel SSE/AVX) would require each bit in a vector representing a pseudonoise sequence to be stored as an explicit +1 or −1 value, using 8 bits or 16 bits to store each single bit in the vector. This would be a significant disadvantage, in terms of required storage in memory or in terms of overhead associated with expanding bits from the vector one at a time to +1 or −1 values after they have been loaded from memory into registers. To implement despreading using an existing SIMD architecture and instruction set would require this inefficient representation of pseudonoise sequences, i.e. not as bit vectors. According to some embodiments, however, an efficient bit-vector representation of the pseudonoise sequence may be used with an SIMD architecture. The despreading system 110 may maintain an efficient (e.g., maximally efficient) representation of a pseudonoise sequence as a bit vector in memory, through the use of registers holding sequence elements prior to their being passed into an appropriate execution unit. In such registers, pseudonoise sequences may be represented as vectors having single-bit or two-bit values per element. As a result, the despreading system 110 may realize improved efficiency and performance over existing despreading mechanisms that fail to maintain space-efficient representations.

A set of SIMD instructions may implement operations for correlating a bit vector with an input. According to some embodiments of this disclosure, because a pseudonoise sequence may be represented as a bit vector, these SIMD instructions may therefore implement a despreading algorithm correlating a pseudonoise sequence with an input that is a sample of a received signal. Execution of the SIMD instructions for correlations may this result in despreading.

In some embodiments, the SIMD instructions may all be multiply-accumulate instructions, where the multiplication is by elements of a pseudonoise sequence that are represented by elements of the bit vector. Each SIMD instruction may include: (a) an input operand, $I_A$, containing a vector of input signal sample values that represent a sample of the input signal being despread; (b) an input operand, $I_B$, containing a vector of values representing partial accumulations of correlation values; (c) an input operand containing a vector of bit values to be used by the instruction, where the vector of bit values may be a pseudonoise sequence represented as a bit vector; and (d) an output operand, $O_A$, containing a vector of values representing updated accumulation of correlation values. All of such operands may be stored in vector registers.

According to some embodiments, the set of SIMD instructions for despreading may include one or more subsets of instructions. These subsets may include a subset of instructions to implement correlation with each of real, imaginary, and complex signal sample values and pseudonoise sequences, where the signal sample values are samples of the received signal being despread. Thus, real, imaginary, and complex signal sample values may each have their own subset of instructions, and each subset may be identified by a specific opcode. The set of instructions may also include various instruction subsets to implement the despreading algorithm for various size data elements. For example, and not by way of limitation, the instructions for input sample values with byte-sized data elements may differ from the instructions for input sample values with halfword-sized data elements. Again, each subset of instructions may be identified by an associated opcode.

For all instructions in the set, the first two input operands, $I_A$ and $I_B$, and the output operand, $O_A$, may be contained in vector registers. For all instructions in the set, the bit vector (e.g., the pseudonoise sequence, according to some embodiments) to be used by a particular instruction may be located in sequential bit positions within a vector register. The bit vector need not occupy the entire vector register. Thus, in some cases, remaining bits in a vector register may be used by one or more subsequent correlation-with-bit-vector instructions. Together, a series of correlations may result in despreading of an entire received signal.

According to some embodiments, the bit vector being processed by an instruction may be treated in traditional SIMD fashion. In other words, there may be a one-to-one association of bits in the vector with data elements in the vector of input sample values and also with SIMD "lanes," where the lanes represent parallel computation paths. The location of a bit vector being used by a particular SIMD instruction, i.e., the location of the first bit in the bit vector, may be specified by that instruction.

Below are examples to further describe the use of SIMD architecture for despreading. For the first two examples, an SIMD width of four is assumed, such that four input sample values fit in a vector register and each bit vector consists of four bits. It may also be assumed that the size of the output values generated by an instruction, and thus also the size of the second set of input values, $I_B$, is the same as the size of the input sample values.

In a first example, the sample values and the pseudonoise sequence values are all real. In this example and the following ones, VRA refers to the vector register that contains the input operand $I_A$; VRB refers to the vector register that contains the input operand $I_B$; VRX refers to the vector register that contains a four-bit vector (e.g., the pseudonoise sequence to be correlated) to be used by the instruction; and VRT refers to the vector register that contains the output operand $O_A$. Let VRA(K), VRB(K), and VRT(K) be the Kth data elements in VRA, VRB, and VRT respectively, where K∈0, 1, 2, 3. Let VRX(M+K) be the Kth bit of the bit vector to be used by the SIMD instruction, where the bit vector begins at bit M in VRX.

In some embodiments, an SIMD processor 150 used in the despreading system 110 may permit data elements in a vector register file to be addressed using mechanisms managed by software, where these data elements need not be vectors but can be a subset of the bits in a vector register. Such a mechanism may enable specifying the location in the vector register file of the bit vector to be used, where this location may be specified as an input operand of an SIMD instruction. In some further embodiments, the parameter M used in the above instruction description may be replaced by an address of the bit field in the vector register file as an offset (e.g., a byte count or bit count) from the origin of the vector register file. It will be understood, however, that there may be various mechanisms available for specifying the value of M in an instruction.

In some embodiments, the SIMD processor 150 may include a set of pointer registers that contain addresses of data elements in the vector register file, with the addresses specified as byte counts or bit counts from the origin of the vector register file. Each pointer register may contain eight byte-count pointers or four bit-count pointers, with the pointer values managed by software. An SIMD instruction may include as an input argument the pointer register containing the address in the vector register file of the bit vector to be used by the instruction. In some embodiments, the instruction may also identify the entry in the pointer register to be used. The ability to specify the location of the bit vector (e.g., offset M in this example) may maximize the flexibility with which the set of SIMD instructions can be used in a true SIMD architecture, especially when support for subword parallelism is included.

Returning to the first example, the SIMD operation implemented by the SIMD instruction may be described by the following pseudocode:

```
for K = 0 to 3 by 1
    if VRX(M+K) == 0 then temp(K) = VRA(K) else temp = -VRA
(K)
    VRT(K) = VRB(K) + temp(K)
end for
```

Figure 2:
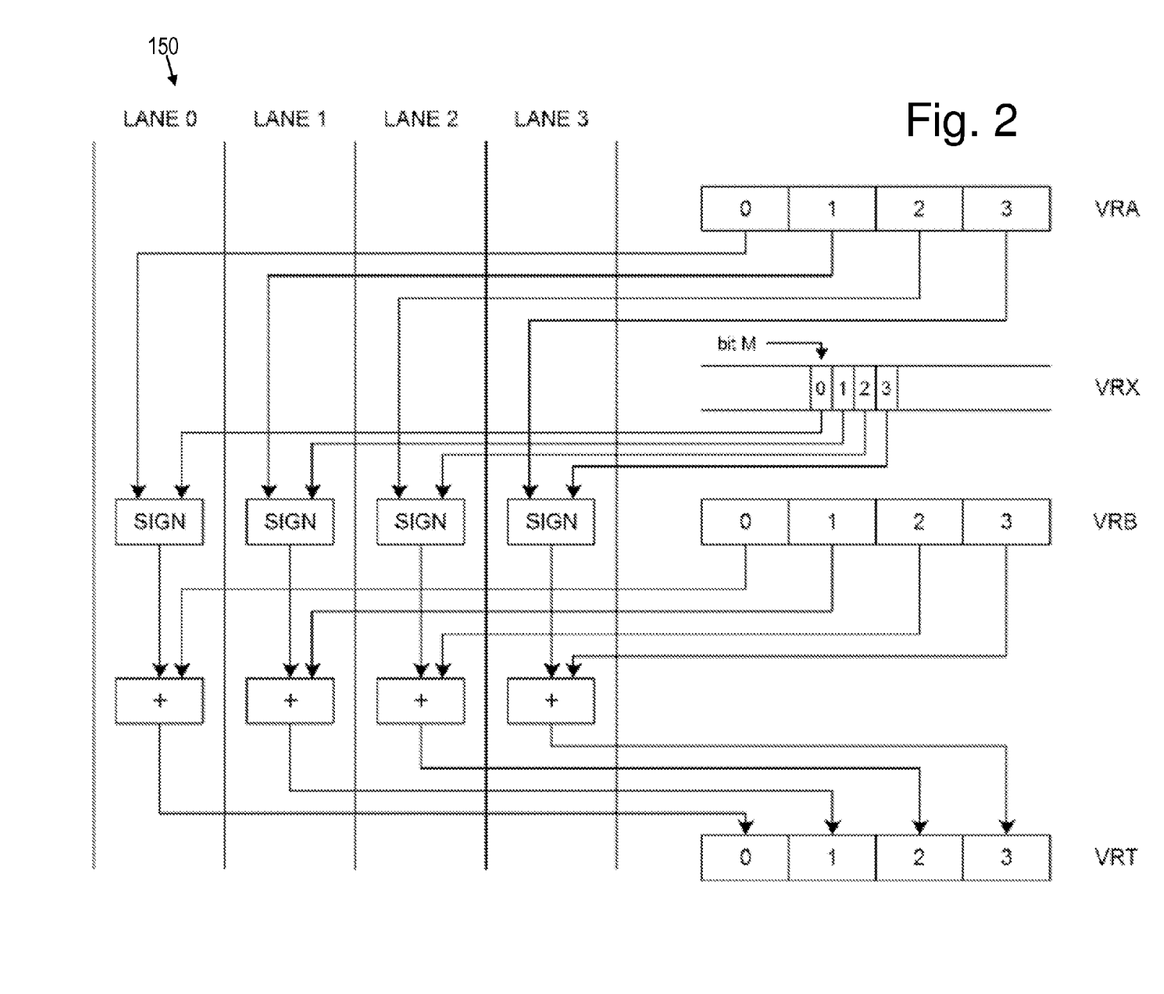
FIG. 2 is a diagram of how a computation proceeds through the lanes of a four-wide SIMD processor, according to some embodiments of this disclosure.

FIG. 2 is a diagram of how a computation proceeds through the lanes of a four-wide SIMD processor 150, according to some embodiments. As shown, the bits of the four-bit vector being used by an instruction may be extracted from vector register VRX beginning with the Mth bit in the register, where the Mth bit in the register is the location of the four-bit vector. The blocks labeled "SIGN" may implement a conditional sign change of the data elements from VRA based on the bits in the bit vector. The outputs of the SIGN blocks may be temporary values temp(K) for each of K=[0, 1, 2, 3]. One of skill in the art will understand that the for-loop in the pseudocode above may occur through parallel elements in the SIMD lanes.

In a second example, again, an SIMD width of four is assumed. This second example is more complicated, with the signal's input sample values and the bit vector values (e.g., the pseudonoise sequence values) being all complex. With a nominal SIMD width of four, each vector register may hold two complex values. The even-indexed elements in a vector register may be real parts of the complex values, and the odd-indexed elements in a vector register may be imaginary parts of the complex values. Analogously, the even-indexed bits in the bit vector may represent real parts of a complex pseudonoise sequence, and the odd-indexed bits may represent imaginary parts of a complex pseudonoise sequence. Further, it may be assumed that the bit vector representing the pseudonoise sequence begins at bit M in VRX, as in the first example above. An SIMD operation implemented by an SIMD instruction may be described by the following pseudocode:

```
for K - 0 to 3 by 2
    bitr(K) = VRX(M+K)
    biti(K) = VRX(M+K+1)
    if bitr(K) == 0 then xr(K) = VRA(K) else xr(K) = -VRA(K)
    if biti(K) == 0 then xi(K) = -VRA(K+1) else xi(K) = VRA(K+1)
    if bitr(K) == 0 then xit(K) = VRA(K+1) else xit(K) = -VRA(K+1)
    if biti(K) == 0 then xrt(K) = VRA(K) else xrt(K) = -VRA(K)
    VRT(K) = VRB(K) + xr(K) + xi(K)
    VRT(K+1) = VRB(K+1) + xrt(K) + xit(K)
end for
```

As with the first example, the bits of the bit vector may be extracted from vector register VRX and distributed across the lanes of the SIMD processor 150.

In a third example, for SIMD architectures that support subword parallelism, the number of data elements contained in a vector register and the number of parallel computation lanes may depend on the size of the data elements. In the first two examples above, the SIMD width is assumed to be four, which may be the case for 32-bit data elements. With subword parallelism, for 16-bit data elements, the SIMD width of the same processor may then be eight. In this case, the instructions outlined in the two examples above may work in the same way, except with K ranging from 0 to 7. The number of bits in the bit vector may remain equal to the SIMD width. In general, the size of the data elements, and thus the number of bits in the bit vector and the SIMD width, may be specified by the corresponding SIMD instruction's opcode.

Implementations using fixed-point arithmetic of sums of products, such as, for example, in the despreading equation shown in Equation 1, often require that the width of the result data elements be greater than the width of the input data elements to avoid arithmetic overflow. Several processors, including some with SIMD architectures, support fixed-point multiply-accumulate operations where the width of the result data elements is greater than the width of the input data elements. For instance, the VMX SIMD architecture defines a set of instructions called "multiply-sum," each of which combines the results of a multiply-accumulate operation from adjacent pairs of lanes in the SIMD, so that the width of the result data elements is twice that of the input data elements. In other words, there are half as many result data elements in a vector register as there are input data elements. It will be understood that this "multiply-sum" technique may be applied to SIMD instructions according to this disclosure, although the disclosure is not limited to this particular technique.

Figure 3:
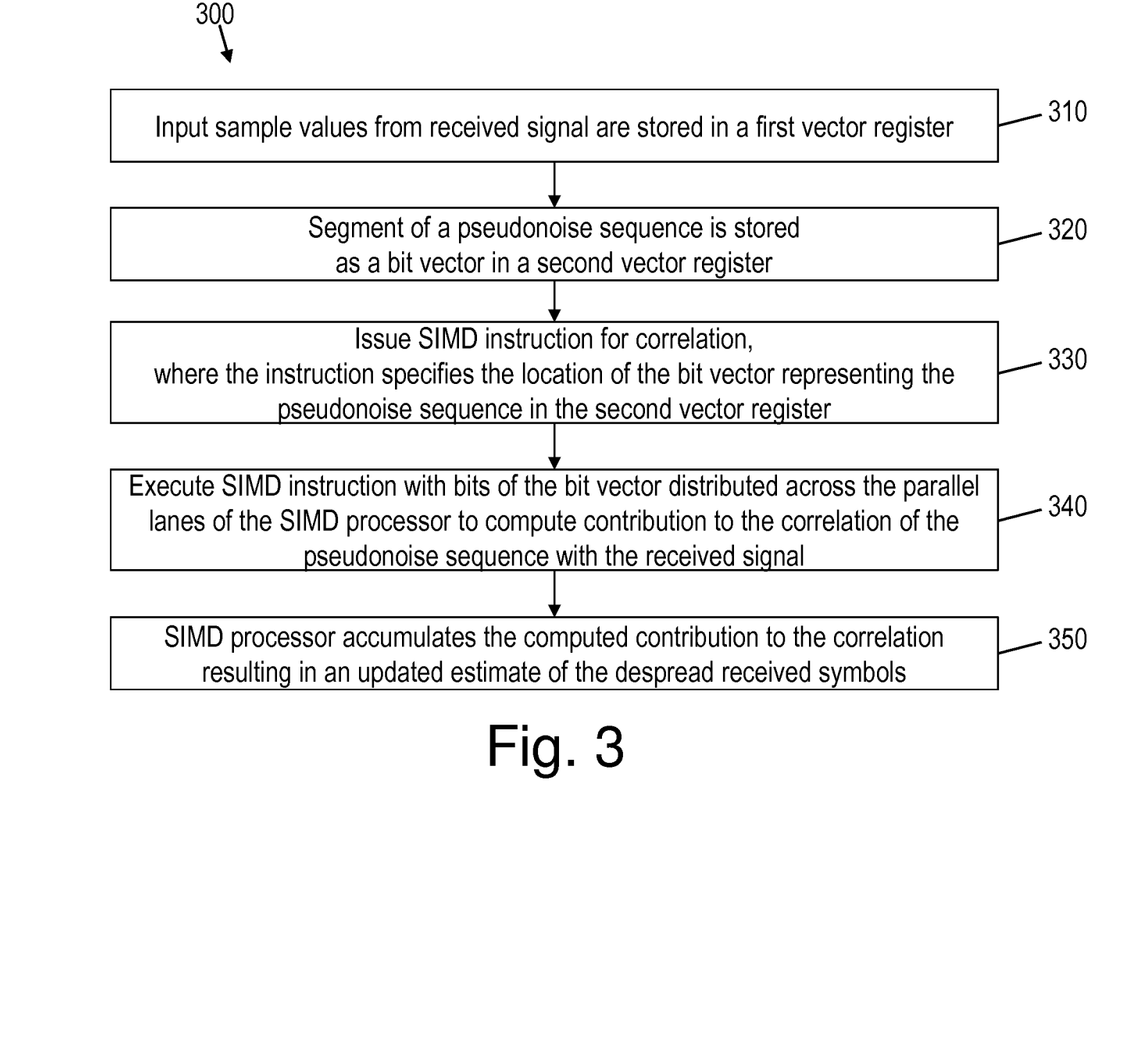
FIG. 3 is a flow diagram of a method for implementing despreading in an SIMD processor, according to some embodiments of this disclosure.

FIG. 3 is a flow diagram of a method 300 for implementing despreading in an SIMD processor, according to some embodiments of this disclosure. At block 310, input samples of the received signal are stored in a first vector register, as described herein. At block 320, a segment of a pseudonoise sequence associated with a first mobile device is stored as a bit vector in a second vector register. The first mobile device may be among two or more devices whose communications are represented in the received signal. At block 330, an SIMD instruction is issued according to this disclosure. The instruction specifies the location of the bit vector representing the pseudonoise sequence in the second vector register. At block 340, the SIMD instruction is executed across an SIMD processor 150, taking advantage of the parallelism inherent in the SIMD processor 150. More specifically, bits of the bit vector representing the pseudonoise sequence are distributed across the parallel lanes of the SIMD processor to compute their contribution to the correlation of the pseudonoise sequence with the received signal. At block 350, the SIMD processor accumulates the computed contribution to the correlation, resulting in an updated estimate of the despread received symbols. Blocks 310 through 350 are repeated until the despreading is complete, at which time the SIMD processor outputs an accumulation result of the correlation, which represents the despread received signal and the communication data corresponding to the first mobile device. It will be understood that FIG. 3 does not limit the various embodiments of the despreading method 300, and that other methods may also be within the scope of this disclosure.

Figure 4:
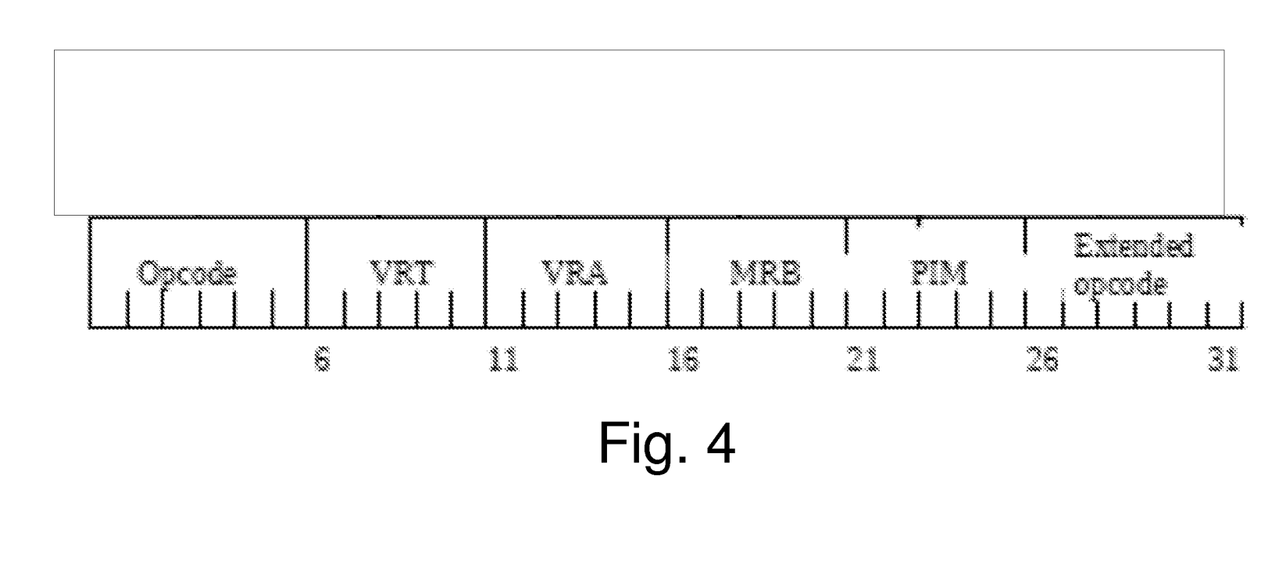
FIG. 4 is an example structure of an SIMD instruction, according to some embodiments of this disclosure.

FIG. 4 is an example structure of an SIMD instruction, according to some embodiments of this disclosure. The depicted structure is consistent with Power ISA instruction formats. It will be understood that the provided structure is for illustrative purposes only and does not limit the various embodiments of this disclosure.

The specifics of the instruction may be identified by the further contents of the opcode and extended opcode fields. Here, the VRA field may identify the vector register that contains the input sample values from the received signal; the VRT field may identify the vector register that contains the accumulated values to which the current product will be added and that will contain the updated accumulated results; the MRB field (i.e., map register field) may identify the pointer register containing the address in the vector register file of the bit vector to be used by the instruction; and the PIM field (i.e., immediate field) may identify the entry in the specified pointer register that is to be used.

Figure 5:
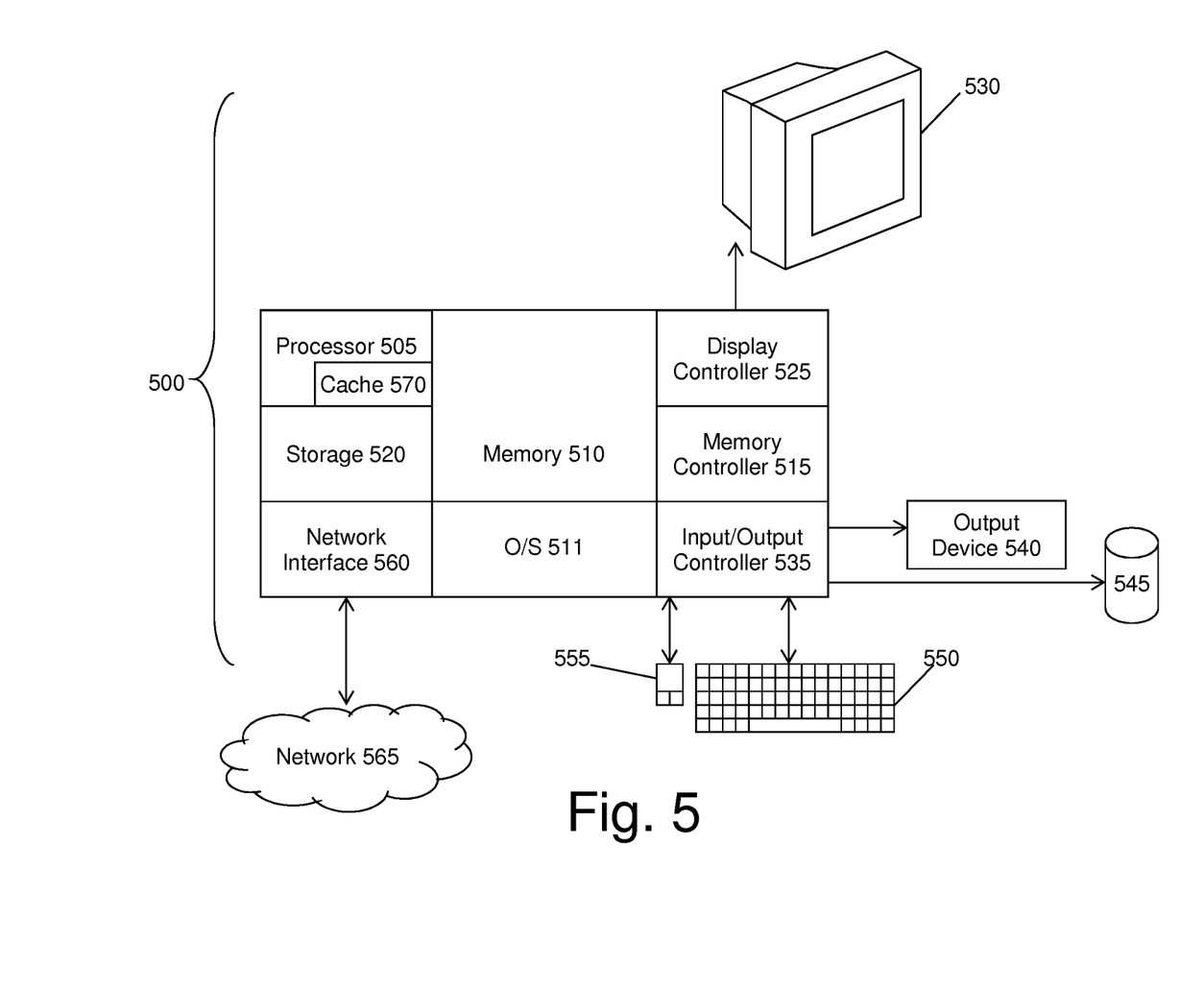
FIG. 5 is a block diagram of a computing device for implementing some or all aspects of the despreading system, according to some embodiments of this disclosure.

FIG. 5 illustrates a block diagram of a computer system 500 for use in implementing a despreading system 110 or method according to some embodiments. The despreading system 110 and methods described herein may be implemented in hardware, software (e.g., firmware), or a combination thereof. In an exemplary embodiment, the methods described may be implemented, at least in part, in hardware and may be part of the microprocessor of a special or general-purpose computer system 500, such as a personal computer, workstation, minicomputer, or mainframe computer.

In an exemplary embodiment, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. A conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be any custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the despreading systems 110 and methods of this disclosure.

The computer system 500 may further include a display controller 525 coupled to a display 530. In an exemplary embodiment, the computer system 500 may further include a network interface 560 for coupling to a network 565. The network 565 may be an IP-based network for communication between the computer system 500 and any external server, client and the like via a broadband connection. The network 565 transmits and receives data between the computer system 500 and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Despreading systems 110 and methods according to this disclosure may be embodied, in whole or in part, in computer program products or in computer systems 500, such as that illustrated in FIG. 5.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a signal comprising communication data from two or more mobile devices, wherein each of the two or more mobile devices is identifiable by an associated pseudonoise sequence, and wherein a first mobile device of the two or more mobile devices is identifiable by an associated first pseudonoise sequence;
   storing two or more samples of the received signal in an input register;
   storing a segment of the first pseudonoise sequence as a bit vector in a second register wherein the segment comprises a sequence of data elements of the first pseudonois sequence, each data element of the segment represented by no more than two bits in the bit vector, and wherein the sequence of data elements occupies sequential bit positions within the second register; and
   processing a single instruction multiple data (SIMD) instruction, by an SIMD processor, to produce correlation values associated with the segment of the first pseudonoise sequence in the second register and the two or more samples of the received signal in the input register;
   wherein the processing of the SIMD instruction comprises distributing the bit vector representing the segment of the first pseudonoise sequence in the second register across two or more lanes of the SIMD processor, wherein a first data element of the sequence of data elements stored in the bit vector is assigned to a first lane of the SIMD processor and a second data element of the sequence of data elements stored in the bit vector is assigned to a second lane of the SIMD processor, and wherein the first lane and the second lane are distinct from each other; and
   wherein the processing of the SIMD instruction contributes to despreading the received signal, and wherein an output of the processing of the SIMD instruction comprises at least a portion of the communication data from the first mobile device.

2. The method of claim 1, wherein the SIMD instruction indicates a location of the bit vector represented the segment of the first pseudonoise sequence within the second register.

3. The method of claim 1, wherein there exists a one-to-one association between bits in the bit vector representing the segment of the first pseudonoise sequence and data elements in the two or more samples of the received signal.

4. The method of claim 1, wherein there exists a one-to-one association between bits in the bit vector representing the segment of the first pseudonoise sequence and parallel computation paths in the SIMD processor.

5. A system comprising:
   a non-transitory memory having computer readable instructions; and
   a processor configured to execute the computer readable instructions, the instructions comprising:
     receiving a signal comprising communication data from two or more mobile devices, wherein each of the two or more mobile devices is identifiable by an associated pseudonoise sequence, and wherein a first mobile device of the two or more mobile devices is identifiable by an associated first pseudonoise sequence;
     storing two or more samples of the received signal in an input register;
     storing a segment of the first pseudonoise sequence as a bit vector in a second register, wherein the segment comprises a sequence of data elements of the first pseudonois sequence, each data element of the segment represented by no more than two bits in the bit vector, and wherein the sequence of data elements occupies sequential bit positions within the second register; and
     submitting a single instruction multiple data (SIMD) instruction to an SIMD processor for processing, to produce correlation values associated with the segment of the first pseudonoise sequence in the second register and the two or more samples of the received signal in the input register;
     wherein the processing of the SIMD instruction comprises distributing the bit vector representing the segment of the first pseudonoise sequence in the second register across two or more lanes of the SIMD processor, wherein a first data element of the sequence of data elements stored in the bit vector is assigned to a first lane of the SIMD processor and a second data element of the sequence of data elements stored in the bit vector is assigned to a second lane of the SIMD processor, and wherein the first lane and the second lane are distinct from each other; and
     wherein the processing of the SIMD instruction contributes to despreading the received signal, and wherein an output of the processing of the SIMD instruction comprises at least a portion of the communication data from the first mobile device.

6. The system of claim 5, wherein the SIMD instruction indicates a location of the bit vector represented the segment of the first pseudonoise sequence within the second register.

7. The system of claim 5, wherein there exists a one-to-one association between bits in the bit vector representing the segment of the first pseudonoise sequence and data elements in the two or more samples of the received signal.

8. The system of claim 5, wherein there exists a one-to-one association between bits in the bit vector representing the segment of the first pseudonoise sequence and parallel computation paths in the SIMD processor.

9. A computer program product for despreading a received signal, the computer program product comprising a non-transitory computer readable storage medium having program instructions embodied therewith, the program instructions executable by a processor to cause the processor to perform a method comprising:
   receiving a signal comprising communication data from two or more mobile devices, wherein each of the two or more mobile devices is identifiable by an associated pseudonoise sequence, and wherein a first mobile device of the two or more mobile devices is identifiable by an associated first pseudonoise sequence;

storing two or more samples of the received signal in an input register;

storing a segment of the first pseudonoise sequence as a bit vector in a second register, wherein the segment comprises a sequence of data elements of the first pseudonois sequence, each data element of the segment represented by no more than two bits in the bit vector, and wherein the sequence of data elements occupies sequential bit positions within the second register; and submitting a single instruction multiple data (SIMD) instruction to an SIMD processor for processing, to produce correlation values associated with the segment of the first pseudonoise sequence in the second register and the two or more samples of the received signal in the input register;

wherein the processing of the SIMD instruction comprises distributing the bit vector representing the segment of the first pseudonoise sequence in the second register across two or more lanes of the SIMD processor, wherein a first data element of the sequence of data elements stored in the bit vector is assigned to a first lane of the SIMD processor and a second data element of the sequence of data elements stored in the bit vector is assigned to a second lane of the SIMD processor, and wherein the first lane and the second lane are distinct from each other; and wherein the processing of the SIMD instruction contributes to despreading the received signal, and wherein an output of the processing of the SIMD instruction comprises at least a portion of the communication data from the first mobile device.

10. The computer program product of claim 9, wherein the SIMD instruction indicates a location of the bit vector represented the segment of the first pseudonoise sequence within the second register.

11. The computer program product of claim 9, wherein there exists a one-to-one association between bits in the bit vector representing the segment of the first pseudonoise sequence and data elements in the two or more samples of the received signal.

12. The computer program product of claim 9, wherein there exists a one-to-one association between bits in the bit vector representing the segment of the first pseudonoise sequence and parallel computation paths in the SIMD processor.

* * * * *